United States Patent
Brabant et al.

(10) Patent No.: US 7,873,795 B2
(45) Date of Patent: Jan. 18, 2011

(54) MULTI-PROCESS SUPPORT IN A SHARED REGISTER

(75) Inventors: Richard Brabant, Roseville, CA (US); Craig VanZante, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 517 days.

(21) Appl. No.: 11/085,547

(22) Filed: Mar. 22, 2005

(65) Prior Publication Data

US 2006/0218355 A1    Sep. 28, 2006

(51) Int. Cl.
 *G06F 13/14* (2006.01)
(52) U.S. Cl. .................. 711/145; 711/117; 711/147; 718/102
(58) Field of Classification Search ............... 711/145, 711/147, 117; 365/189.02; 718/102
 See application file for complete search history.

(56) References Cited

U.S. PATENT DOCUMENTS

| | | | | |
|---|---|---|---|---|
| 3,740,723 | A * | 6/1973 | Beausoleil et al. | 711/117 |
| 6,182,108 | B1 * | 1/2001 | Williams et al. | 718/102 |
| 2001/0021951 | A1 * | 9/2001 | Kimura et al. | 709/310 |
| 2003/0188073 | A1 * | 10/2003 | Zatorski | 710/306 |
| 2003/0212859 | A1 * | 11/2003 | Ellis et al. | 711/114 |
| 2006/0004988 | A1 * | 1/2006 | Jordan | 712/43 |

* cited by examiner

*Primary Examiner*—Yong Choe

(57) ABSTRACT

A method of, shared register system and system for controlling access to a register are described. The shared register stores a plurality of bits including control and data bits. An access signal and a combined signal including a control portion and a data portion are received and the data portion of the combined signal is written to one or more data bits of the shared register corresponding to the control portion of the combined signal. A shared register system for controlling access to portions of a shared register includes a register having storage for bits and a register access control configured to receive an access signal and a combined signal. The register access control is operatively connected with the register to control write access to the register based on the access signal and the control portion of the combined signal.

21 Claims, 3 Drawing Sheets

MULTI-PROCESS SUPPORT IN A SHARED REGISTER

FIELD OF THE INVENTION

The present invention relates to multi-process support in a shared register.

BACKGROUND

Control signals used for networking processors are typically stored in registers for access by processes executed by the processor. In situations where multiple processes are executed by the processor, one specific and dedicated register is allocated per individual set of control signals used by the processor. Each different set of control signals resides in a separate individual register. Because the control signals only require a few bits for storage, using an entire register leaves many unused bits.

Another approach to storing the control signal data in a shared register is to use a software locking mechanism to prevent writing to the register by concurrently executing processes. Under this approach, the following steps are performed by execution of a sequence of instructions by the processor while disallowing execution of the instructions by another executing process. The contents of the register are read and merged together with the control data to be written. All read values of the register not owned by the writing process are retained during the merge and the merged control data is then written to the register. Management of the locking mechanism according to this approach is cumbersome and adds additional complexity to the executing processes.

SUMMARY

The present invention provides a method of writing data to a selected portion of a register based on the contents of the data to be written.

A method aspect includes controlling write access to portions of a shared register, where the shared register stores a plurality of bits including one or more control bits and one or more data bits. An access signal and a combined signal having a control portion and a data portion are received. The data portion of the combined signal is written to the one or more data bits of the shared register corresponding to the control portion of the combined signal.

A shared register system embodiment includes a register having storage for one or more bits and a register access control. The register access control is configured to receive an access signal and a combined signal comprising a control portion and a data portion. The register access control is operatively connected with the register to control write access to the register based on the access signal and the control portion of the combined signal.

A system embodiment for controlling access to a register includes a register access control configured to receive an access signal and a combined signal comprising a control portion and a data portion. The register access control is arranged to be connected with a register to control write access to the register based on the access signal and the control portion of the combined signal.

Still other advantages of the embodiments will become readily apparent to those skilled in the art from the following detailed description, wherein the preferred embodiments are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Writing data to a selected portion of a register based on the contents of the data to be written.

Figure 1:
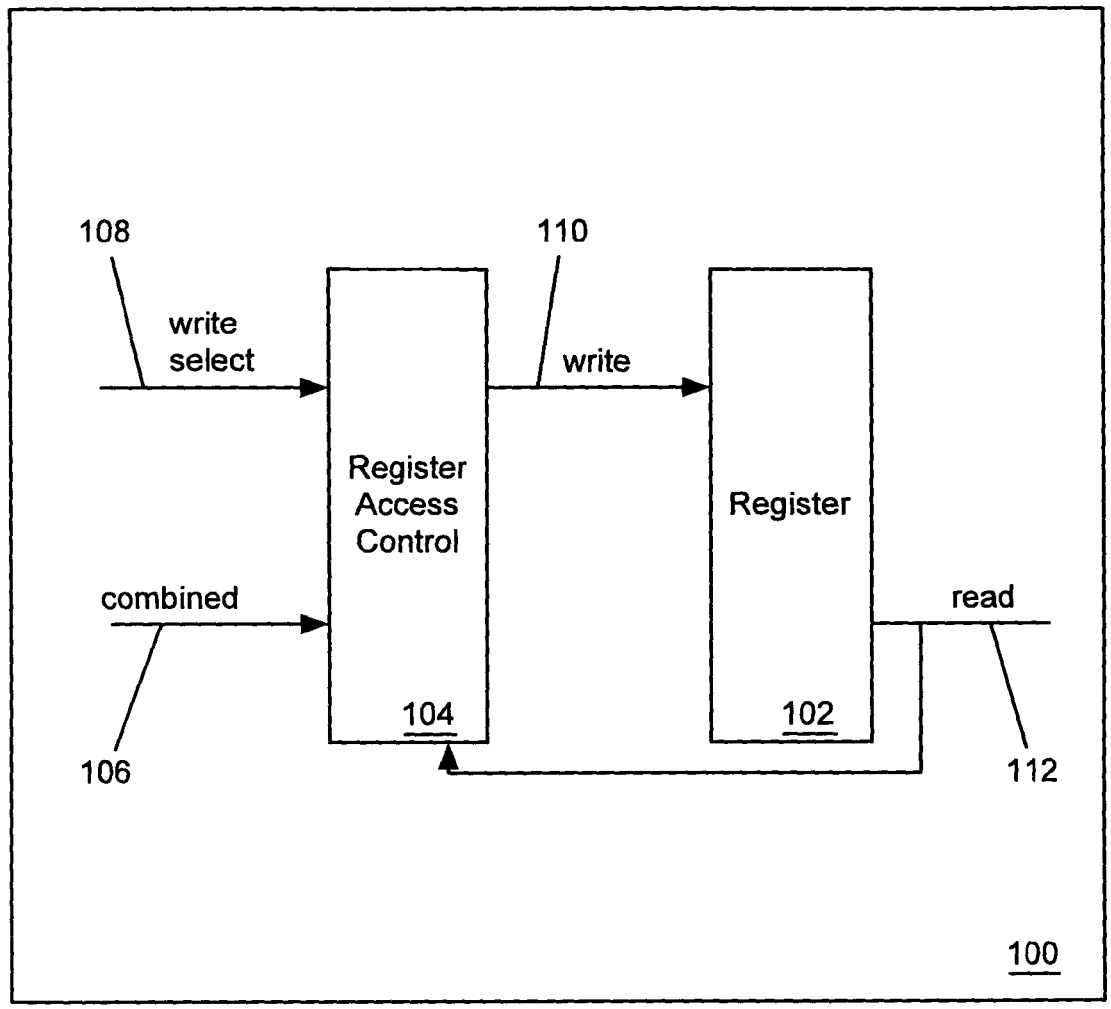
FIG. 1 is a high level block diagram of an embodiment of the present invention.

FIG. 1 depicts a high level block diagram of a portion of a network processor 100 used in a network component for handling network traffic, e.g., a network switch, etc. Processor 100 includes logic devices, clock circuits, and other devices (not shown) in FIG. 1 in order to operate properly. Network processor 100 executes instructions, e.g., firmware instructions stored in memory (not shown), causing the processor to perform networking operations. For example, the network component may transmit packets of information received from one location to another location via network links connected to the network component, e.g., wired or wireless network connections such as IEEE 802.3, 802.11, etc.

Network processor 100 includes a register 102 for storing information, e.g., control data related to configuration and operation of processes executed by network processor 100. Although other sizes may be used in different embodiments, in one embodiment register 102 stores 32 bits of information. Register 102 receives, stores, and transmits information from/to other components of network processor 100.

Network processor 100 further includes a register access control 104 connected to register 102 and controlling write access to the register. In an embodiment, a given process executed by processor 100 writes information for storage to register 102 via register access control 104.

In operation, processor 100 executing a process attempting to write information to register 102 causes the processor to drive a combined signal 106 and a write select signal 108 to register access control 104. Combined signal 106 includes the information which is to be written to register 102 and write select signal 108 is required for enabling writing to the register. Combined signal 106 includes one or more bits of information to be written and register access control 104 includes a corresponding one or more physical data lines for receiving the combined signal. Specifically, combined signal 106 includes a data portion and a control portion.

For a particular network processor 100, more than one set of instructions may be executed simultaneously, e.g., in a multiprocessing fashion. Each executing process executes independently from each other process. The particular configuration of the network component determines the scope of the executing process' control. A set of control data defining the particular configuration includes several bits specifying configuration information for each of the executing processes. In one embodiment, 5 bits are used to specify the configuration for a particular executing process on a network processor. It is to be understood that more or less bits may be used depending on the specific implementation.

In an embodiment, the processor 100 examines the control data bits to determine whether to perform a function, e.g., illuminate or flashlight emitting diodes (LEDs) on the network component. For example, some LEDs relate to the network interfaces, some relate to software status (e.g., error conditions), and others indicate hardware status (e.g., fan status, power supply status, etc). In this embodiment, the bits determine the control voltages of signals/pins on the network component. Separate processes monitor the status and request independent control of respective LEDs.

In another embodiment, processor 100 examines the control data bits to determine a control configuration of network ports for setting parameters such as speed, duplex, enabling, options, etc. According to this embodiment, these signals stay internal to networking processor 100 and modify the processor's behavior. In an alternate embodiment, the signals are provided external to networking processor 100.

Because register 102 may be shared among more than one executing process, the control portion of the combined signal 106 identifies the particular set of bits of the register able to be written to by the combined signal. In an embodiment, four control bits are used to specify the writeability of each set of five bits making up the data portion of the combined signal 106.

Figure 2:
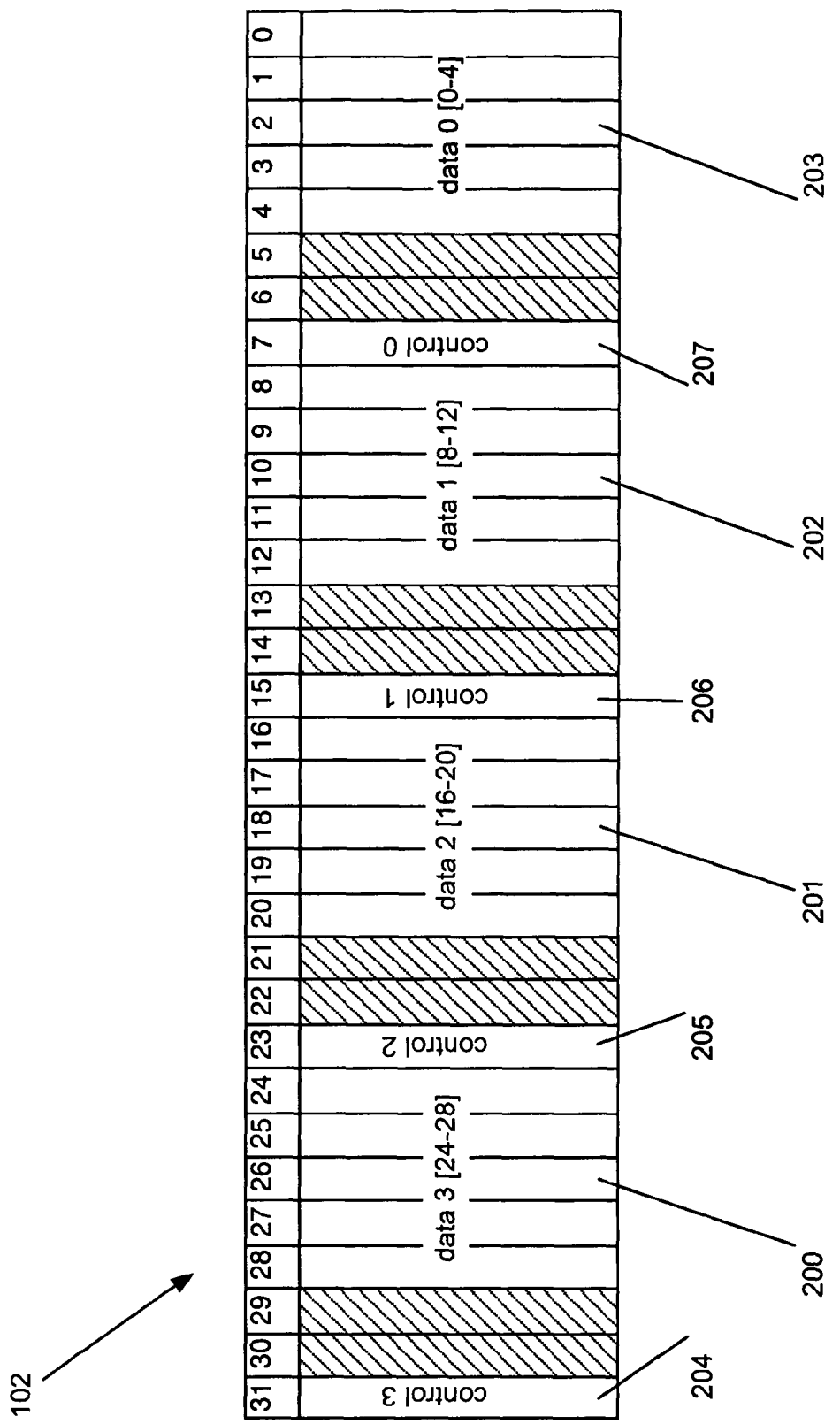
FIG. 2 is a high level diagram of a register of the FIG. 1 embodiment.

FIG. 2 depicts a high level view of information, e.g., combined signal 106, stored in a 32 bit version of register 102, described above. As depicted, register 102 stores information in four data sections 200-203 and four sets of corresponding control sections 204-207. In the FIG. 2 embodiment, register 102 includes 32 bits and stores 5 bits in each of the four data sections 200-203 and a single bit in each of the corresponding control sections 204-207. Bit 31 of control section 204 stores a bit value indicating whether a process is able to write data to bits 24-28 of data section 200. Bits 23, 15, and 7 respectively store bits values indicating whether a process is able to write data to bits 16-20 of data section 201, bits 8-12 of data section 202, and bits 0-4 of data section 203.

In an alternate embodiment, data sections 200-203 may have different numbers of bits. For example, data sections 200-203 may include 1, 2, 3, 4, 6, or 7 bits according to the FIG. 2 version of register 102. Further, register 102 may include more or less numbers of bits and data and control sections.

Returning to FIG. 1, based on the received write select signal 108 and the control section of combined signal 106, register access control 104 writes information to register 102 via a write line 110. The information written by register access control 104 over write line 110 includes bits making up the control sections 204-207 and bits making up the data sections 200-203 (FIG. 2). Also depicted in FIG. 1, a read line 112 connects register 102 with register access control 104 to provide the contents of the register to the register access control. In this manner and according to the below described embodiment, register access control 104 writes select bits from, either or both, combined signal 106 and read line 112 to register 102.

Although depicted as a single line, each line in FIG. 1 (write select signal 108, combined signal 106, write line 110, and read line 112) represents one or more lines according to the particular embodiment. Accordingly, with respect to the FIG. 2 register 102 embodiment, combined signal 106, write line 110, and read line 112 are lines able to transmit 32 bits of information. In one particular embodiment, combined signal 106, write line 110, and read line 112 each include 32 lines.

In operation, register access control 104 receives a combined signal 106 having a format similar to register 102 as depicted in FIG. 2. That is, combined signal 106 includes data sections including control data for storage in register 102 and control sections for determining which data sections of the combined signal are to be written to the register. As described with respect to FIG. 2, there is a correspondence between control sections and data sections.

In particular assuming a write select signal 108 is received by register access control 104, if a particular control section bit is set in the received combined signal 106, then the corresponding data section bits of the received combined signal are written over write line 110 to register 102. Conversely, if a particular control section bits is not set in the received combined signal 106, then corresponding data section bits of the received combined signal are not written over write line 110 to register 102. Instead, the corresponding data Section bits of the signal received over read line 112 from register 102 are written over write line 110 to register 102.

In this manner, register access control 104 selectively writes portions of either combined signal 106 and/or the signal received over read line 112. Further, each process executed by processor 100 is able to share access to register 102 by virtue of the fact that each attempt to write to the register by a process includes a different control section which is set for enabling writing of a different corresponding data section of register 102. For example, a first process is enabled to write bits 24-28 of data section 200 by setting bit 31 of control section 204. A second process is enabled to write bits 16-20 of data section 201, bits 8-12 of data section 202, and bits 0-4 of data section 203 by having bits 23, 15, and 7 of control sections 205, 206, and 207 being set. Based on the foregoing, a write attempt by the second process changes only the bits of the data sections for which the corresponding control section bits are enabled for the second process, i.e., control sections 205, 206, and 207.

Figure 3:
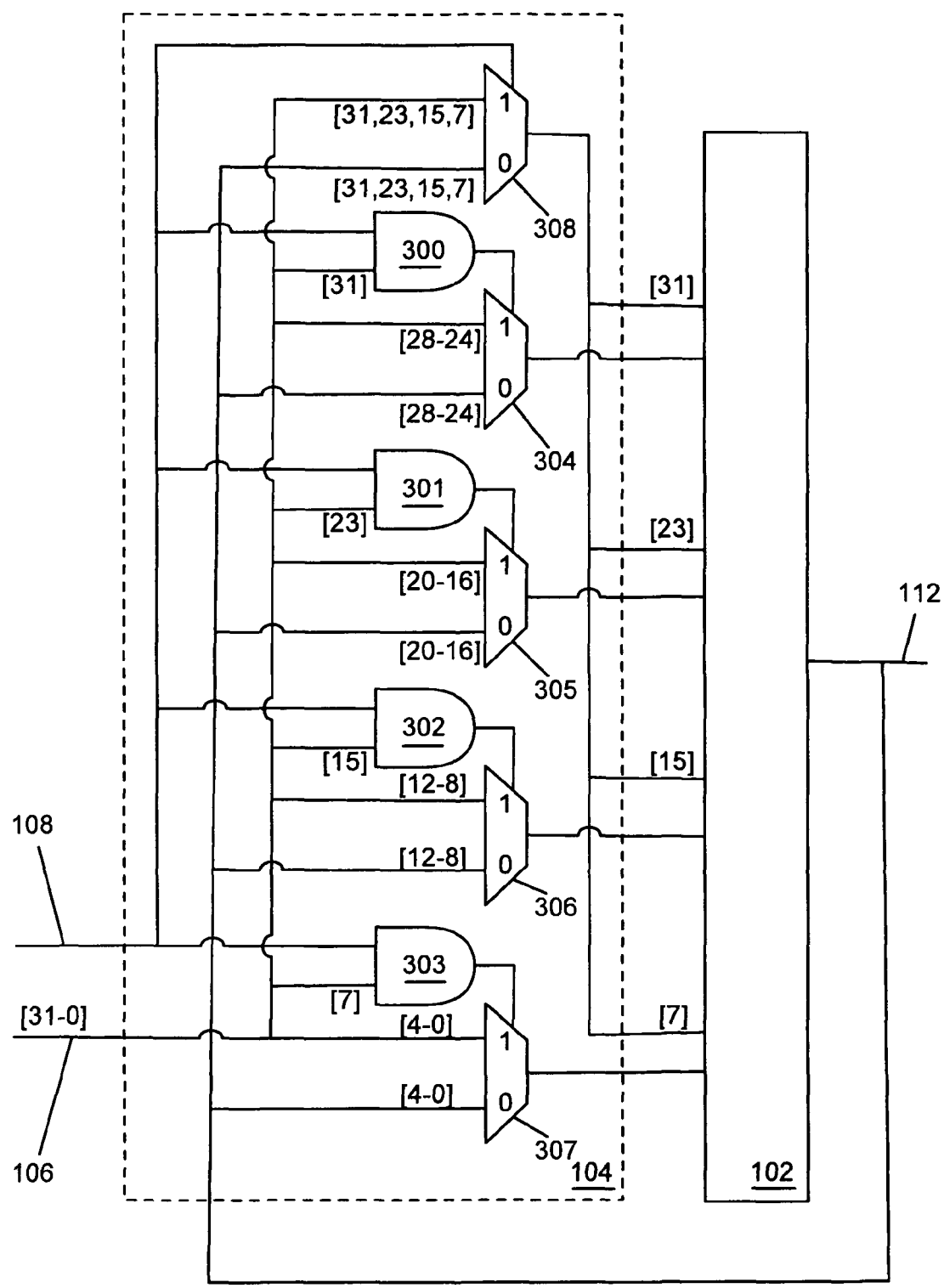
FIG. 3 is a gate level block diagram of a portion of the FIG. 1 embodiment.

Turning now to FIG. 3, a logic implementation of register access control 104 from FIG. 1 is depicted in connection with register 102. register access control 104 includes a set of four AND logic gates 300-303 connected with a set of four multiplexer gates 304-307, respectively. Each of AND logic gates 300-303 receives as input write select signal 108 and one of control sections 204-207 from combined signal 106 and provides an output signal to a corresponding one of the set of four multiplexer gates 304-307.

Each multiplexer gate 304-307 receives as input one of data sections 200-203 from combined signal 106 and the corresponding data section from the signal over read line 112 from register 102. That is, the multiplexer gate receives a data section for writing from combined signal 106 and the existing data section in register 102. As described above, each multiplexer gate 304-307 also receives the output of AND logic gate 300-303 corresponding to the multiplexer gate as input.

As further depicted in FIG. 3, AND logic gate 300 receives bit 31 of combined signal 106 and multiplexer gate 304 receives bits 24-28 of combined signal 106 and read line 112 signal. Similarly, AND logic gates 301-303 receive bits 23, 15, and 7, respectively, and multiplexer gates 305-307 receive bits 16-20, 8-12, and 0-4, respectively.

Based on the input from and logic gate 300-303, multiplexer gate 304-307 provides as output to register 102 over write line 110 one of the two received input data sections. For example, assuming the first process described above attempts to write to register 102, and logic gate 300 receives as input write select signal 108 and bit 31 of control section 204. As described above, the write select signal 108 is received and bit 31 is set for the first process and based thereon AND logic gate 300 generates an enabling signal transmitted to multiplexer 304 as input causing the multiplexer to write the received data section of combined signal 106 to register 102. However, because bits 23, 15, and 7 of control sections 205-207 of the first process are not set, AND logic gates 301-303 failed to generate enabling signal to transmit to multiplexer 305-307. Because an enabling signal is not received by multiplexer 305-307, each multiplexer writes the received data section of read line 112 signal from register 102 over write line 110 to register 102. In this manner, the existing data sections of register 102 to which the first process is not enabled to write are not overwritten by the first process.

Register access control 104 includes a control section multiplexer gate 308 which receives as input the control section of combined signal 106 and the control section of read line 112 signal from register 102 register access control 104 also receives write select signal 108 as a control and put to select from among the other two inputs for transmission over write line 110 to register 102. Control section multiplexer gate 308 transmits the received controls section from combined signal 106 if write select signal 108 is received. If write select signal 108 is not received by multiplexer gate 308, the multiplexer gate transmits the received control section from the read line 112 signal. In this manner, the existing control sections of register 102 are not overwritten without receipt of write select signal 108.

Executable software accessing register 102 takes into account the presence of the control bits, e.g., the control section, in accessing the register. In order to retrieve information from register 102, all bits except the data bits need to be masked. Executable software writing to register 102 needs to include the appropriate control bits in the data write to the register, i.e., combined signal 106. Register 102 removes the need to perform a read/modify/write operation in order to preserve the other data bits stored in the register if a particular executable software access is not overwriting the entire contents. For example, in order to modify the contents of data section 200 of register 102 without modifying the contents of data sections 201-203, executable software performs a write to the register and includes control bit 204 set to indicate write enable with respect to the data section. The executable software need not be configured to read the contents of register 102, modify the read contents to include the data section 200 to be written to the register, and then write the modified contents back to the register. In this manner, multiple steps may be eliminated in an embodiment.

In an embodiment, the content of data sections 200-203 includes logically grouped together data bits controllable via a single control bit 204-207. In this manner, a single process may control plural data bits in a data section.

It will be readily seen by one of ordinary skill in the art that the embodiments fulfills one or more of the advantages set forth above. After reading the foregoing specification, one of ordinary skill will be able to affect various changes, substitutions of equivalents and various other aspects of the embodiments as broadly disclosed herein. It is therefore intended that the protection granted hereon be limited only by the definition contained in the appended claims and equivalents thereof.

For example, a large set of different configurations for storing the control portion and the data portion are possible with a minimum of complexity. Further, concurrent and independent processes executing in the network component are able to easily share a register while storing multiple data portions each owned individually per each process.

Further advantageously, the executable instruction overhead required for implementation is minimized to provide support for the data atomicity of shared registers used by multiple processors.

Additionally, development cost and risk of errors in the executable instructions using the shared register according to the above embodiments is reduced.

What is claimed is:

1. A method of controlling write access to portions of a shared register, wherein the shared register stores a plurality of bits including one or more control bits and one or more data bits, comprising the steps of:

receiving (1) a write select signal and (2) a combined signal comprising a control portion identifying particular bits of the shared register able to be written to by the combined signal and a data portion;

comparing the write select signal and the control portion of the combined signal, and generating a data write signal if the write select signal and the control portion of the combined signal are both asserted; and selectively writing, based on the generated data write signal, the data portion of the combined signal to one or more data bits of the shared register corresponding to the control portion of the combined signal.

2. The method of claim 1, wherein the shared register includes one control bit corresponding to a set of one or more data bits.

3. The method of claim 2, wherein the shared register includes four control bits and four sets of one or more data bits.

4. The method of claim 1, wherein the writing step further comprises writing the control portion of the combined signal to the one or more control bits.

5. The method of claim 1, wherein the writing step further comprises writing the existing contents of the one or more data bits of the shared register which do not correspond to the control portion of the combined signal to the one or more data bits of the shared register.

6. The method of claim 1, further comprising the step of:
allocating two or more control bits to different processes for accessing the shared register.

7. The method of claim 1, wherein the writing step comprises overwriting only the one or more data bits of the shared register which correspond to the control portion of the combined signal.

8. A shared register system, comprising:
a register having storage for one or more bits; and
a register access control configured to receive a write select signal and a combined signal comprising a control portion and a data portion, the register access control operatively connected with the register to control write access to the register based on the write select signal and the control portion of the combined signal,
wherein the register access control includes a comparison device receiving the write select signal and the control portion of the combined signal and generating a data write signal if the write select signal and the control portion of the combined signal are asserted, and
wherein the control portion of the combined signal identifies particular bits of the shared register able to be written to by the combined signal.

9. The system of claim 8, wherein the data portion of the combined signal is written to the register if the write select signal and the control portion of the combined signal are asserted.

10. The system of claim 9, wherein the register access control is configured to receive a read signal from the register including the data portion and control portion stored in the register.

11. The system of claim 8, wherein the register access control further comprises:
a multiplexer receiving the data portion of the combined signal and operatively connected to the comparison device such that if a data write signal is received from the comparison device, the multiplexer writes the data portion of the combined signal to the register.

12. The system of claim 11, wherein the register access control further comprises:
a control multiplexer adapted to receive the control portion of the combined signal and the write select signal and adapted to generate a control write signal including the control portion of the combined signal if the write select signal is asserted, the control multiplexer operatively connected with the register.

13. The system of claim 12, wherein the control multiplexer is adapted to receive a control portion from the register and wherein the generated control write signal includes the control portion from the register if the write select signal is not asserted.

14. The system of claim 8, wherein there is a one-to-one correspondence between the control portion and the data portion of the combined signal.

15. The system of claim 14, wherein the combined signal comprises one or more control portions and one or more data portions.

16. The system of claim 8, wherein the register includes storage for control bits and data bits.

17. The system of claim 8, wherein the register includes four control bits and four sets of one or more data bits.

18. A system for controlling access to a register, comprising:
a register access control configured to receive a write select signal and a combined signal comprising a control portion and a data portion, the register access control arranged to be connected with a register to control write access to the register based on the write select signal and the control portion of the combined signal,
wherein the register access control includes a comparison device receiving the write select signal and the control portion of the combined signal and generating a data write signal if the write select signal and the control portion of the combined signal are asserted, and
wherein the control portion of the combined signal identifies particular bits of the shared register able to be written to by the combined signal.

19. The system of claim 18, wherein the register access control further comprises:
a multiplexer receiving the data portion of the combined signal and operatively connected to the comparison device such that if a data write signal is received from the comparison device, the multiplexer writes the data portion of the combined signal to the register.

20. The system of claim 19, wherein the register access control further comprises:
a control multiplexer adapted to receive the control portion of the combined signal and the write select signal and adapted to generate a control write signal including the control portion of the combined signal if the write select signal is asserted, the control multiplexer operatively connected with the register.

21. A method of controlling write access to portions of a shared register, wherein the shared register stores a plurality of bits including one or more control bits and one or more data bits, comprising the steps of:
receiving (1) a write select signal and (2) a combined signal comprising a control portion identifying particular bits of the shared register able to be written to by the combined signal and a data portion;
comparing the write select signal and the control portion of the combined signal, and generating a data write signal if the write select signal and the control portion of the combined signal are both asserted;
writing the data portion of the combined signal to the one or more data bits of the shared register corresponding to the control portion of the combined signal; and
allocating two of the one or more control bits to different processes for accessing the shared register.

* * * * *